(12) United States Patent
Zhou et al.

(10) Patent No.: US 8,891,648 B2
(45) Date of Patent: Nov. 18, 2014

(54) SYSTEM FOR TRANSMITTING AND RECEIVING CHANNEL STATE INFORMATION

(75) Inventors: Lei Zhou, Beijing (CN); Zheng Zhao, Beijing (CN); Zongchuang Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 13/060,210

(22) PCT Filed: Aug. 21, 2009

(86) PCT No.: PCT/KR2009/004667
§ 371 (c)(1),
(2), (4) Date: Feb. 22, 2011

(87) PCT Pub. No.: WO2010/024556
PCT Pub. Date: Mar. 4, 2010

(65) Prior Publication Data
US 2011/0150117 A1   Jun. 23, 2011

(30) Foreign Application Priority Data
Aug. 27, 2008 (CN) .......................... 2008 1 0212640

(51) Int. Cl.
| | | |
|---|---|---|
| H04B 7/02 | (2006.01) | |
| H04B 7/04 | (2006.01) | |
| H04B 7/06 | (2006.01) | |
| H04L 25/03 | (2006.01) | |
| H04L 25/02 | (2006.01) | |

(52) U.S. Cl.
CPC ....... *H04L 25/03343* (2013.01); *H04L 25/0246* (2013.01); *H04B 7/0417* (2013.01); *H04B 7/0626* (2013.01); *H04L 25/0242* (2013.01); *H04L 25/0224* (2013.01); *H04L 25/0204* (2013.01)
USPC ............. 375/267; 375/299; 375/347; 455/69; 455/101

(58) Field of Classification Search
None
See application file for complete search history.

(56) References Cited

U.S. PATENT DOCUMENTS

| | | |
|---|---|---|
| 2005/0105589 A1 | 5/2005 | Sung et al. |
| 2005/0249159 A1 | 11/2005 | Abraham et al. |
| 2005/0265436 A1 | 12/2005 | Suh et al. |
| 2006/0270360 A1* | 11/2006 | Han et al. .......................... 455/69 |
| 2007/0281624 A1* | 12/2007 | Thomas et al. ............ 455/67.11 |
| 2010/0002607 A1* | 1/2010 | Kim et al. ...................... 370/280 |
| 2010/0135177 A1* | 6/2010 | Liu et al. ....................... 370/252 |
| 2012/0230233 A1* | 9/2012 | Jia et al. ........................ 370/280 |

* cited by examiner

*Primary Examiner* — Adolf Dsouza
(74) *Attorney, Agent, or Firm* — Jefferson IP Law, LLP

(57) ABSTRACT

A system for transmitting and receiving Channel State Information (CSI) is provided, in which a terminal receives a pilot signal transmitted from a transmitter, the terminal estimates CSI of part of downlink channels based on the received pilot signal, the terminal superposes the CSI of part of downlink channels onto a uplink sounding signal orthogonally, and transmits them together; the transmitter obtains the CSI of the rest part of downlink channels by estimating the uplink sounding signal, the transmitter performs orthogonal de-multiplexing on the received signal to obtain the CSI of the part of downlink channels, the transmitter, by using the CSI of the two parts of downlink channels, pre-codes downlink data and transmits it to the terminal.

25 Claims, 2 Drawing Sheets

SYSTEM FOR TRANSMITTING AND RECEIVING CHANNEL STATE INFORMATION

TECHNICAL FIELD

The present invention relates to the field of wireless mobile communication technology, and in particular to a system for transmitting and receiving channel state information.

BACKGROUND ART

Currently, wireless services are getting more importance, and demand on higher network capacity and performance keeps growing. On the other hand, several current solutions, such wider frequency band, optimal modulation scheme, and even code multiplexing system has a limited potential in improving spectrum efficiency.

A Multiple Input Multiple Output (MIMO) system uses an antenna array and thus space multiplexing technology to improve bandwidth usage efficiency. In many reality applications, channel parameters can be obtained via a feedback channel between a receiver and a transmitter (given that feedback delay is far less than channel coherence time). In addition, in a TDD (time division duplex) system, if operations of data receiving and data transmitting is completed within a ping pong period, an estimation value of the channel in a receiving mode can be applied in a transmitting mode (given that the ping pong period is far less than channel coherence time). Therefore, there comes a problem that how to utilize channel estimation values to optimize a transmitter's transmitting scheme and accordingly to design an optimal receiver. At present, studies in this respect include linear and nonlinear optimal pre-coding techniques. Although the nonlinear pre-coding method has a better performance than the linear pre-coding method, its implementation complexity is far higher than that of the latter. So, the linear pre-coding method is the mainstream under research. The linear pre-coding technique makes full use of all or part of CSI (Channel State Information) to obtain as much beam-shaping gain as possible.

In a MIMO system, the transmitter needs to obtain a pre-coding matrix if a pre-coding based processing will be implemented. There are two methods for obtaining a pre-coding matrix, one is that the transmitter obtains the pre-coding matrix after it obtains a channel matrix H from an uplink sounding signal transmitted by the receiver, and the other is that the transmitter obtains the pre-coding matrix from CQI (Channel Quality Indicator) or Pre-coded Matrix Index fed back from the receiver. In an FDD mode of a communication system, uplink and downlink communications occupy different frequency bands. In this case, only the second method, i.e., by feedback from the receiver, can be adopted to obtain information on the pre-coding matrix. While in a TDD mode, both of the above methods can be adopted to obtain the pre-coding matrix. In the TDD mode, if the transmitter can accurately obtain the pre-coding matrix, system performance can be improved, and the complexity in the receiver can be reduced. In the TDD mode, the CSI fed back in the second method has some quantization error, and such feedback requires much greater overhead. Therefore, the MIMO system tends to use the first method (i.e., by uplink sounding signal) to obtain channel matrix H in the TDD mode, and then obtain the pre-coding matrix. However, the number of antennas at the transmitter is greater than antennas at the receiver in a future MIMO system, and thus uplink and downlink antenna configurations does not matched with each other. Consequently, it is impossible for the transmitter to obtain complete channel state information (CSI) from the uplink sounding signal. This problem needs to be settled.

In a TDD mode, the transmitter can accurately obtain the pre-coding matrix V through two methods. The first method is that the transmitter performs SVD decomposition to the received channel matrix H, which is obtained from the uplink sounding signal transmitted by the receiver. The second method is that the transmitter obtains the pre-coding matrix from a codebook of quantized CSI fed back by the receiver. The second method is suitable for a FDD mode, since the uplink and the downlink occupy different frequency bands in a FDD mode, and no reciprocity exists between the uplink and downlink. So, only the method using CSI fed back from the receiver can be used to obtain the pre-coding matrix. On the other hand, in a TDD mode, the method using a codebook of CSI fed back from the receiver will be subjected to channel quantization error and much greater feedback overhead. This reason is that reciprocity exists between the uplink and downlink channel impulse responses in a TDD mode of a mobile communication system. Therefore, the downlink channel impulse response can be obtained by estimating that of the uplink. At present, for a MIMO-OFDM system in TDD mode, channel response is primarily estimated by inserting discrete pilot in a data frame. Unfortunately, in order to estimate channel impulse matrix H, it is necessary to interpolate the estimated discrete channel response, and it is impossible to obtain an accurate channel impulse matrix H.

In a TDD mode, it is possible to obtain a relatively accurate channel impulse matrix H by using the uplink sounding signal to support pre-coding. However, the number of antennas at the transmitter is greater than antennas at the receiver in a future MIMO system, and thus uplink and downlink antenna configurations are not matched with each other. Consequently, it is impossible for the transmitter to obtain complete channel state information (CSI) from the uplink sounding signal.

DISCLOSURE OF INVENTION

Solution to Problem

The object of the present invention is to provide a system for transmitting and receiving CSI (channel sate information).

To achieve the above object, a system for transmitting and receiving channel state information (CSI) is provided, in which a terminal receives a pilot signal transmitted from a transmitter;

the terminal estimates CSI of part of downlink channels based on the received pilot signal;

the terminal superposes the CSI of part of downlink channels onto a uplink sounding signal orthogonally, and transmits them together;

the transmitter obtains the CSI of the rest part of downlink channels by estimating the uplink sounding signal;

the transmitter performs orthogonal de-multiplexing on the received signal to obtain the CSI of the part of downlink channels;

the transmitter, by using the CSI of the two parts of downlink channels, pre-codes downlink data and transmits it to the terminal.

With the system of the present invention, it is possible to solve the problem that the transmitter can not obtain complete CSI due to the fact that uplink and downlink antenna configurations are not matched with each other. Accordingly, it is possible to improve system performance and reduce the complexity of the receiver. Meanwhile, system overhead can be suppressed.

BEST MODE FOR CARRYING OUT THE INVENTION

The present invention addresses the problem that the transmitter can not obtain complete CSI due to the fact that uplink and downlink antenna configurations are not matched with each other.

In the receiver, part of the antennas, which allows signal transmission or are non-surplus antennas, can be used in both transmitting and receiving data. On the other hand, the rest of the antennas, surplus antennas, can be used in only receiving data but not transmitting data.

According to the present invention, the transmitter at a Base Station (BS) transmits a pilot (midamble or preamble) signal. A Use Equipment (UE) utilizes the received pilot (midamble or preamble) signal to estimate some of Downlink Channel State Information. Then, UE loads the downlink CSI of the surplus antennas to an orthogonal sequence and superposes it to an uplink (UL) sounding signal for transmitting. Having received this signal, the transmitter de-multiplexes it orthogonally. The transmitter estimates the uplink CSI of the terminal's transmitting antennas based on the uplink sounding signal, and according to TDD channel reciprocity principle, obtains the CSI of some of the downlink transmitting antennas. Meanwhile, by de-multiplexing the CSI of the downlink of the surplus antennas orthogonally, the transmitter obtains the rest part of downlink CSI of the surplus antennas. Now, the transmitter combines the two parts of the CSI to obtain the complete CSI of the downlink channels. Then, the transmitter pre-coded the downlink data with the obtained CSI of the downlink channels, and transmits it out. In this way, the present invention settles the problem that the transmitter can not obtain complete CSI due to the fact that uplink and downlink antenna configurations are not matched with each other, improves system performance and reduces the complexity of the receiver and the system overhead. Meanwhile, the method of the present invention is superior to pre-coding with a codebook in terms of performance.

Figure 1:
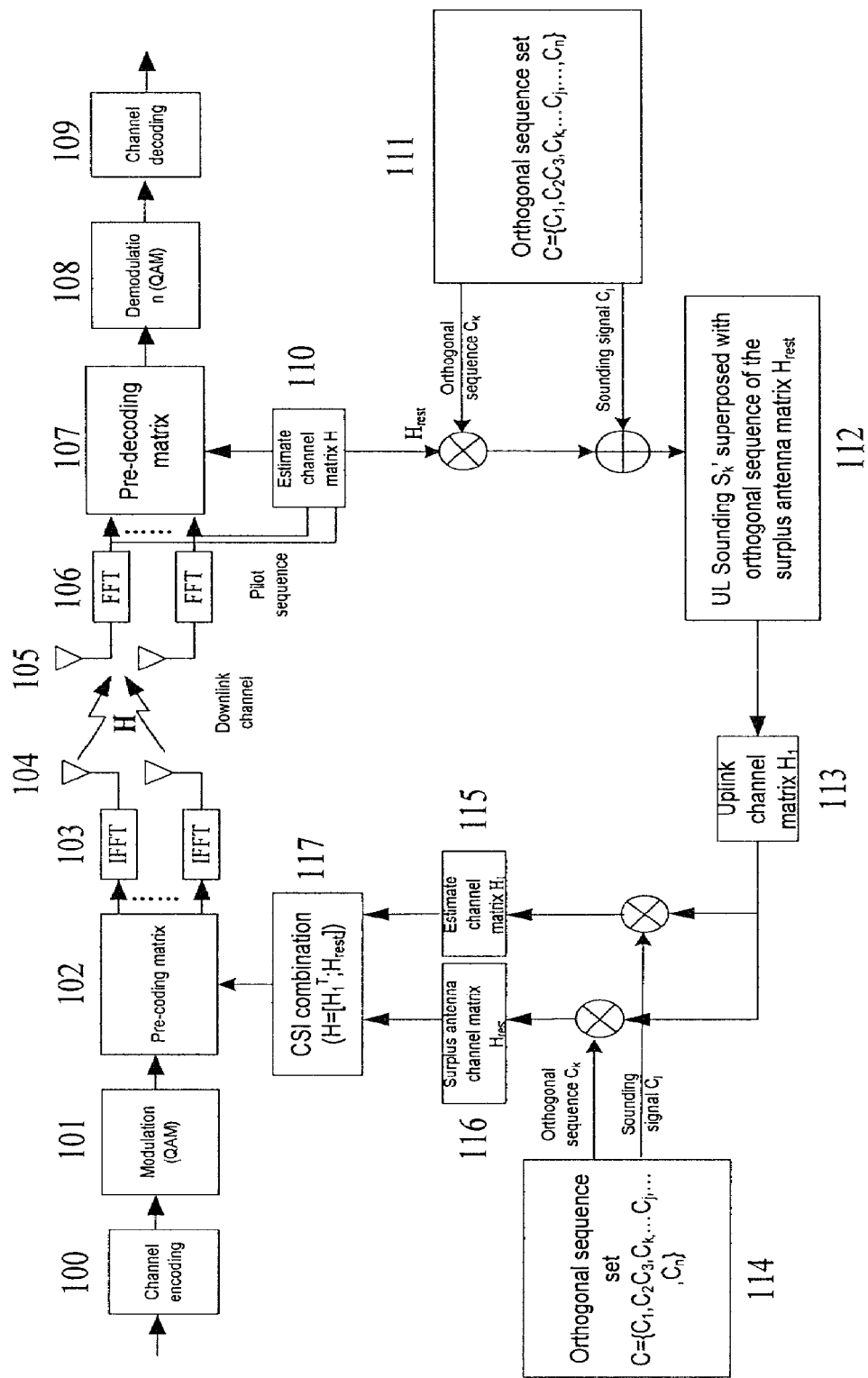
FIG. 1 shows a block diagram of the system according to the present invention.

FIG. 1 shows a block diagram of a Closed-Loop MIMO pre-coding design based on orthogonal sequence hybrid feedback in a TDD mode. As can be seen in this figure, the system comprises a transmitter of BS, a receiver UE and MIMO channels (downlink channels and uplink channels). The transmitter mainly includes the following modules:

100 channel coding module, primarily adopted to perform channel coding on information bits, in order to improve data transmission efficiency and reduce bit error rate (BER);

101 modulation module, adopted to map the coded bit information into constellation points on a modulation constellation;

102 pre-coding module, mainly adopted to eliminate channel interference in advance for beam shaping and thus to reduce the receiver's complexity;

103 IFFT (Inverse Fast Fourier Transform) module, mainly adopted to perform multi-carrier OFDM modulation;

104 multi-antenna transmitting module, mainly adopted to cooperate with a multi-antenna module at the receiver to improve channel capacity and reliability and to reduce the BER (bit error rate);

114 orthogonal sequence set module, adopted to providing respective orthogonal sequences for channel estimation and obtaining of the channel matrix of the surplus antennas;

115 channel estimation module, adopted by the transmitter to estimate the uplink channel matrix $H_1$ by use of orthogonality of the orthogonal sequence, and according to TDD channel reciprocity principle (please refer to H. A. Lorentz, "The theorem of Poynting concerning the energy in the electromagnetic field and two general propositions concerning the propagation of light," Amsterdammer Akademie der Wetenschappen 4 p. 176, 1996.), to obtain the downlink channel matrix $H_1^T$ associated with the antennas which allows signal transmission;

116 channel matrix $H_{rest}$ of surplus antennas (in the receiver, part of the antennas, which allows signal transmission or are non-surplus antennas, can be used in both transmitting and receiving data, on the other hand, the rest of the antennas, surplus antennas, can be used in only receiving data but not transmitting data), $H^{rest}$ representing the downlink CSI matrix associated with the surplus antennas;

117 channel combining module, mainly adopted to combine the surplus antennas; channel matrix $H_{rest}$ with H1 to form $H=[H_1^T; H_{rest}]$.

In FIG. 1, the receiver is primarily includes the following modules:

105 multi-antenna receiving module, mainly adopted to cooperate with the multi-antenna module at the transmitter to improve channel capacity and reliability and reduce bit error rate;

106 FFT (Fast Fourier Transform) module, mainly adopted to perform multi-carrier OFDM demodulation;

107 pre-decoding module, mainly adopted to eliminate channel interference;

108 demodulation module, adopted to map the constellation points into the coded bit information;

109 channel decoding module, adopted to translate the coded bit information into information bits and perform error correction on the information bits;

110 channel estimating module, mainly adopted to estimate the downlink CSI matrix H by using the downlink pilot signal;

111 orthogonal sequence set module, mainly adopted to provide orthogonal codes (the orthogonal sequences in both the receiving and transmitters) for sounding signals and orthogonal loading sequences;

112 orthogonal sequence-loaded uplink sounding signal module, adopted to superpose the orthogonal sequence carrying the surplus antenna's CSI onto the uplink sounding signal.

Details of the operation of the system are as follows:

1) at the transmitter, information bits are coded by the channel coding module;

2) the coded data is subjected to base-band modulation in the modulation module and then is multiplied by the pre-coding matrix for transmitting data symbols; here, the pre-coding matrix is calculated by decomposing (e.g., SVD decomposition: $H=U\Sigma V^*$) the channel matrix H obtained by combining the channel matrix $H_1$ (which is estimated from the UL sounding signal from the receiver) and the surplus antenna channel information $H_{rest}$ superposed onto the orthogonal sequence;

3) the resultant data symbols are allocated onto OFDM sub-carriers to be transmitted out;

4) the data symbols arrives at the receiver over the channels;

5) at the receiver, the pilot signal is utilized by the FFT module to estimate the channel matrix H;

6) the receiver conducts the following two operations using the estimated channel matrix H:

(1) obtaining $H_{rest}$ ($H=[H_1^T;H_{rest}]$) with H and loading it onto the orthogonal sequence; then superposing the orthogonal sequence onto the UL Sounding signal; finally, transmitting it to the transmitter through the uplink channel;

(2) eliminating channel effects on the data after FFT;

7) The data symbols after elimination of channel effects are pre-decoded with the pre-decoding matrix, and the data symbols are mapped into a bit stream in the de-modulation module;

8) The bit data is error-corrected in the channel decoding module, and then the information bits are outputted.

Now, description of formula derivation is given.

Given the surplus antenna channel matrix $H_{rest}=[h_1, h_2, \ldots, h_k, \ldots h_L]$, the orthogonal sequence set $C=[C_1, C_2, \ldots, C_k, \ldots C_m]$, superposition of surplus antenna channel information onto the orthogonal sequences can be formulated as MathFigure 1

[Math.1]

$$M_k = h_k C_k \quad (1)$$

The superposition of the orthogonal sequences carrying the surplus antenna channel information to the UL Sounding signal can be formulated as MathFigure 2

[Math. 2]

$$S'_k = \sum_{i=0}^{n} M_i + C_k \quad (2)$$
$$= \sum_{i=0, i \neq k}^{n} h_i C_i + C_k$$

Suppose the uplink CSI matrix $H_1=[h_1', h_2', \ldots, h_k', \ldots, h_n']$, $N_k$ denotes the additive white Gaussian noise, the signal received at the transmitter is MathFigure 3

[Math. 3]

$$y_k = h'_k \sum_{i=0}^{n} h_i C_i + h'_k C_k + N_k \quad (3)$$

According to correlation characteristics of the orthogonal sequences

MathFigure 4

[Math. 4]

$$\mathrm{corr}_{i,j} = \sum_{n=0}^{L-1} C_{i,n} C_{j,n} = \begin{cases} 0 & i \neq j \\ L & i = j \end{cases} \quad (4)$$

both the channel matrix $H_1$ and $H_{rest}$ can be obtained with the above formula (3). $H_1$ and $H_{rest}$ are combined into $H=[H_1^T;H_{rest}]$. Then, the pre-coding matrix is obtained with a pre-coding matrix decomposition formula (e.g., SVD decomposition: $H=U\Sigma V^*$, where $U^*$ denotes the pre-coding matrix, $V^*$ denotes the pre-decoding matrix; also, there are some other decomposition methods; sometimes only the pre-coding matrix is applied, while the pre-decoding matrix is not applied).

Hereafter, a frame structure for the system is described.

Figure 2:
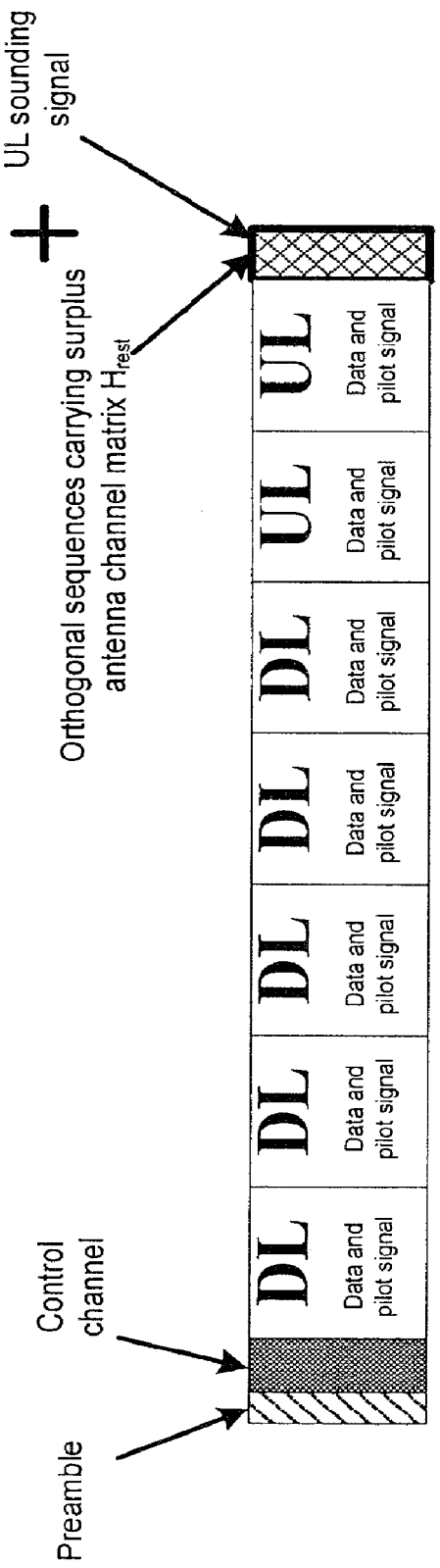
FIG. 2 shows a frame structure of the system.

FIG. 2 shows the frame structure for the system, in which the frame structure comprises the following four parts:

1) pilot signal sequence, mainly adopted for downlink synchronization, and also possibly for downlink channel estimation;

2) control channel, mainly adopted to request the receiver to transmit a UL sounding signal superposed with orthogonal sequences carrying surplus antenna CSI, and to notify the receiver to prepare for pre-coding;

3) data and pilot signal, mainly adopted to transfer information, the pilot signal being adopted to estimate the downlink CSI;

4) UL Sounding signal superposed with orthogonal sequences, mainly adopted by the transmitter to obtain the downlink CSI matrix H.

Specific Example

In an IEEE802.16m system operating in a TDD mode, when user equipment, MS, needs to transmit data over one same channel for a long time, and to accurately learn about the downlink (BS→MS) channel response in real time, the system will make a choice so that the MS will transmit a UL Sounding signal for channel response H estimation. However, since the system requires that two antennas for transmitting and two antennas for receiving in the downlink, and one antenna for transmitting and two antennas for receiving in the uplink, MIMO configurations for uplink and downlink are not consistent with each other, which results in the problem that the transmitter can not obtain complete downlink CSI by using the UL Sounding signal. So, it is necessary to adopt certain auxiliary method to feed back the CSI of the surplus antenna.

The invention claimed is:

1. A system for transmitting and receiving channel state information (CSI), the system comprising:
a receiver for receiving a pilot signal transmitted from a transmitter, for estimating CSI of part of downlink channels based on the received pilot signal, for superposing the CSI of part of downlink channels onto an uplink sounding signal orthogonally, and for transmitting the uplink sounding signal superposed with orthogonal sequences carrying the CSI of part of the downlink channels; and
the transmitter for obtaining the CSI of a rest part of downlink channels by estimating the uplink sounding signal superposed with orthogonal sequences carrying the CSI of part of downlink channels, for performing orthogonal de-multiplexing on the received signal to obtain the CSI of the part of downlink channels, for, by using the CSI of the two parts of downlink channels, pre-coding downlink data, and for transmitting it to the receiver.

2. The system of claim 1, wherein the transmitter comprises:
a pre-coding module for eliminating channel interference of the receiver;
an inverse fast Fourier transform (IFFT) module for performing multi-carrier orthogonal frequency-division multiplexing (OFDM) modulation on the pre-coded signal;

an orthogonal sequence set module for providing respective orthogonal sequences for channel estimation and for obtaining a channel matrix $H_{rest}$ of surplus antennas;

a channel estimation module for estimating an uplink channel matrix $H_1$ by use of orthogonality of the orthogonal sequences; and a channel combining module for combining the surplus antennas' channel matrix $H_{rest}$ with $H_1$ into $H=[H_1^T; H_{rest}]$.

3. The system of claim 2, wherein the surplus antennas are antennas for signal receiving.

4. The system of claim 1, wherein the receiver comprises:
a fast Fourier transform (FFT) module for performing multi-carrier orthogonal frequency-division multiplexing (OFDM) demodulation on the signals received through antennas;

a pre-decoding module for eliminating channel interference;

a channel estimating module for estimating a downlink CSI matrix H by use of the downlink pilot signal;

an orthogonal sequence set module for providing orthogonal codes for the sounding signals and the superposed orthogonal sequences; and a module for an uplink (UL) Sounding signal superposed with the orthogonal sequences for superposing the orthogonal sequences carrying a surplus antenna's CSI onto the UL Sounding signal.

5. A method for operation of a receiver, the method comprising:
receiving a pilot signal transmitted from a transmitter;
estimating channel state information (CSI) of downlink channels for at least one surplus antenna, based on the received pilot signal; and
superposing the CSI of downlink channels of the at least one of the surplus antennas onto an uplink sounding signal orthogonally, and transmitting the uplink sounding signal superposed with orthogonal sequences carrying the CSI of the downlink channels of the at least one surplus antenna,
wherein each of the downlink channels of the at least one surplus antenna corresponds to a channel for which a transmission antenna at the transmitter does not have a matching reception antenna at the receiver.

6. The method of claim 5, further comprising:
performing multi-carrier orthogonal frequency-division multiplexing (OFDM) demodulation on the signals received through the antennas, using a fast Fourier transform (FFT) operation;
estimating a downlink CSI matrix H by use of the downlink pilot signal;
eliminating channel interference which is included in the received signals, by using the downlink CSI matrix H;
de-modulating the received signals; and
channel-decoding the demodulated signals.

7. The method of claim 5, further comprises:
providing orthogonal codes for the sounding signals and the superposed orthogonal sequences,
wherein the uplink (UL) Sounding signal is superposed onto the orthogonal sequences carrying the surplus antenna's CSI.

8. The method of claim 5, wherein the surplus antennas are antennas for signal receiving.

9. A method for operation of a transmitter, the method comprising:
obtaining channel state information (CSI) of a rest part of downlink channels by estimating an uplink sounding signal superposed with orthogonal sequences carrying the CSI of part of downlink channels;
obtaining CSI of a part of downlink channels by performing orthogonal de-multiplexing on a received signal; and
pre-coding downlink data by using the CSI of the two parts of downlink channels, and transmitting it to a receiver.

10. The method of claim 9, further comprising:
eliminating channel interference of a receiver; and
performing multi-carrier orthogonal frequency-division multiplexing (OFDM) modulation on the pre-coded signal using an inverse fast Fourier transform (IFFT) operation.

11. The method of claim 9, further comprising:
providing respective orthogonal sequences for channel estimation and obtaining a channel matrix $H_{rest}$ of surplus antennas.

12. The method of claim 11, wherein the surplus antennas are antennas for signal receiving.

13. The method of claim 9, wherein an uplink channel matrix $H_1$ is estimated, based on an orthogonality of orthogonal sequences.

14. The method of claim 9, wherein a matrix for pre-coding the downlink data is determined, by a singular value decomposition (SVD) of the downlink channel (H).

15. A receiver in a multiple antenna system, the receiver comprising:
a receiving module for receiving a pilot signal transmitted from a transmitter;
a pre-coding module for estimating channel state information (CSI) of downlink channels for at least one surplus antenna, based on the received pilot signal; and
an orthogonal sequence-loaded uplink sounding signal module for superposing the CSI of downlink channels of the at least one of surplus antennas onto an uplink sounding signal orthogonally, and for transmitting the uplink sounding signal superposed with orthogonal sequences carrying the CSI of downlink channels of the at least one surplus antenna,
wherein each of the downlink channels of the at least one surplus antenna corresponds to a channel for which a transmission antenna at the transmitter does not have a matching reception antenna at the receiver.

16. The receiver of claim 15, wherein the pre-coding module eliminates channel interference which is included in the received signals, by using a downlink CSI matrix H, and
wherein the receiver further comprising:
a fast Fourier transform (FFT) module for performing multi-carrier orthogonal frequency-division multiplexing (OFDM) demodulation on the signals received through the antennas, using an FFT operation;
a channel estimating module for estimating the downlink CSI matrix H by use of the downlink pilot signal;
a de-modulation module for de-modulating the received signals; and
a channel-decoding module for channel-decoding the demodulated signals.

17. The receiver of claim 15, further comprising:
an orthogonal sequence set module for providing orthogonal codes for the sounding signals and the superposed orthogonal sequences,
wherein an uplink (UL) Sounding signal is superposed onto the orthogonal sequences carrying the surplus antenna's CSI.

18. The receiver of claim 15, wherein the surplus antennas are antennas for signal receiving.

19. A transmitter in a multiple antenna system, the transmitter comprising:
- a channel estimation module for obtaining channel state information (CSI) of a rest part of downlink channels by estimating an uplink sounding signal superposed with orthogonal sequences carrying the CSI of part of downlink channels;
- a channel matrix module for obtaining the CSI of a part of downlink channels by performing orthogonal de-multiplexing on a received signal; and
- a pre-coding module for pre-coding downlink data by using the CSI of the two parts of downlink channels, and for transmitting it to a receiver.

20. The transmitter of claim 19, further comprising:
- a fast Fourier transform (FFT) module for performing multi-carrier orthogonal frequency-division multiplexing (OFDM) modulation on the pre-coded signal using an inverse fast Fourier transform (IFFT) operation.

21. The transmitter of claim 19, further comprising:
- an orthogonal sequence set module for providing respective orthogonal sequences for channel estimation and obtaining of a channel matrix $H_{rest}$ of surplus antennas.

22. The transmitter of claim 21, wherein the surplus antennas are antennas for signal receiving.

23. The transmitter of claim 19, wherein an uplink channel matrix $H_1$ is estimated, based on an orthogonality of the orthogonal sequences.

24. The transmitter of claim 19, wherein a matrix for pre-coding the downlink data is determined, by a singular value decomposition (SVD) of the downlink channel (H).

25. A terminal for transmitting and receiving Channel State Information (CSI), the terminal comprising:
- a plurality of antennas comprising a first subset of antennas for transmitting and receiving data and a second subset of antennas for receiving but not transmitting data;
- wherein the terminal estimates CSI for the first subset of antennas based on a received pilot signal, and estimates CSI for the second subset of antennas based on a channel estimation of an uplink sounding signal superposed with orthogonal sequences carrying the CSI of part of downlink channels.

* * * * *